United States Patent
Buist, Sr.

(10) Patent No.: US 10,772,709 B2
(45) Date of Patent: Sep. 15, 2020

(54) DENTAL IMPLANT HAVING SPLIT FINS

(71) Applicant: Charles Buist, DMD, PA, Hilton Head Island, SC (US)

(72) Inventor: Charles Buist, Sr., Irmo, SC (US)

(73) Assignee: Charles Buist, DMD, PA, Hilton Head Island, SC (US)

( * ) Notice: Subject to any disclaimer, the term of this patent is extended or adjusted under 35 U.S.C. 154(b) by 271 days.

(21) Appl. No.: 15/956,812

(22) Filed: Apr. 19, 2018

(65) Prior Publication Data

US 2019/0321140 A1    Oct. 24, 2019

(51) Int. Cl.
*A61C 8/00* (2006.01)

(52) U.S. Cl.
CPC ............ *A61C 8/0025* (2013.01); *A61C 8/006* (2013.01); *A61C 8/0037* (2013.01)

(58) Field of Classification Search
CPC ...... A61C 8/0025; A61C 8/0037; A61C 8/006
USPC .................................................. 433/172–176
See application file for complete search history.

(56) References Cited

U.S. PATENT DOCUMENTS

| | | | | |
|---|---|---|---|---|
| 4,406,623 A * | 9/1983 | Grafelmann | ......... | A61C 8/0022 433/174 |
| 4,687,443 A * | 8/1987 | Driskell | ............... | A61C 8/0018 433/173 |
| 6,010,502 A | 1/2000 | Bagby | | |
| 6,273,722 B1 * | 8/2001 | Phillips | ................. | A61C 8/0018 433/173 |
| RE37,646 E * | 4/2002 | Zuest | .................... | A61C 8/0018 433/173 |
| 8,221,119 B1 * | 7/2012 | Valen | .................... | A61C 8/0025 433/174 |
| 8,864,495 B2 | 10/2014 | Chen | | |
| 9,597,167 B2 * | 3/2017 | Buurlage | .............. | A61C 8/0018 |
| 10,537,408 B2 * | 1/2020 | Stuebinger | ........... | A61C 8/0074 |

(Continued)

FOREIGN PATENT DOCUMENTS

| CN | 203710168 U | 7/2014 |
|---|---|---|
| CN | 106725934 A | 5/2017 |

(Continued)

OTHER PUBLICATIONS

Park dental mini dental implants, URL: http://healthdocbox.com/Dental_Care/65856531-Park-dental-mini-dental-implants.html, Mar. 8, 2018.

*Primary Examiner* — Matthew M Nelson
(74) *Attorney, Agent, or Firm* — Burr & Forman LLP; Hunter S. Freeman

(57) ABSTRACT

The present invention relates to a dental implant having at least one but preferably a plurality of split fins that are vertically spaced along the vertical axis of the body portion of the implant. These split fins hold the body portion of a dental implant stationary within the patient's jaw by engaging the patient's jawbone and promoting osseointegration—the growth bone around and on the surface of the implant. Each split fin has a first end that is vertically spaced from a second end along the implant body's vertical axis such that the split fin extends from the first end and around the body's circumference along an inclined plane until it terminates at the second end so that the split fin creates a single spiral that extends around the entire circumference of the body portion of the implant.

20 Claims, 4 Drawing Sheets

(56) References Cited

U.S. PATENT DOCUMENTS

| | | | |
|---|---|---|---|
| 2002/0102518 A1* | 8/2002 | Mena | A61C 8/0022 433/174 |
| 2005/0089818 A1* | 4/2005 | Engman | A61B 17/8625 433/174 |
| 2005/0147943 A1* | 7/2005 | Chang | A61C 8/0018 433/174 |
| 2007/0009854 A1* | 1/2007 | Morgan | A61C 8/0022 433/173 |
| 2008/0280254 A1* | 11/2008 | Ackermann | A61C 8/0022 433/174 |
| 2011/0111369 A1* | 5/2011 | Laster | A61B 17/0401 433/174 |
| 2014/0141388 A1* | 5/2014 | Dukhan | A61C 8/006 433/174 |
| 2014/0186799 A1 | 7/2014 | Pan et al. | |
| 2015/0099239 A1* | 4/2015 | Gourlaouen-Preissler | A61C 8/0024 433/174 |
| 2015/0250562 A1* | 9/2015 | Urakabe | A61C 8/0015 433/174 |
| 2016/0166358 A1* | 6/2016 | Thome | A61C 8/0075 433/174 |
| 2017/0071702 A1 | 3/2017 | Fromovich | |
| 2017/0281318 A1* | 10/2017 | Thome | A61C 8/0075 |
| 2018/0014917 A1* | 1/2018 | Jang | A61C 8/0016 |
| 2019/0008614 A1* | 1/2019 | Weitzel | A61C 8/00 |

FOREIGN PATENT DOCUMENTS

| | | |
|---|---|---|
| DE | 10236125 B4 | 7/2006 |
| WO | WO2011027338 A1 | 3/2011 |

\* cited by examiner

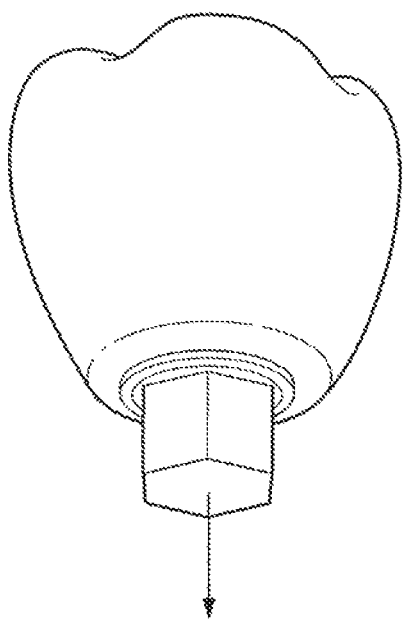
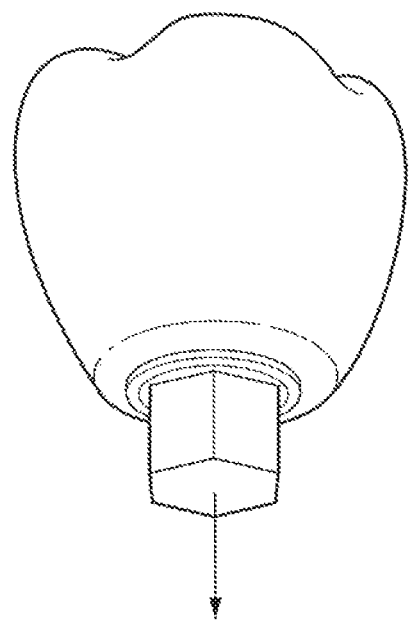
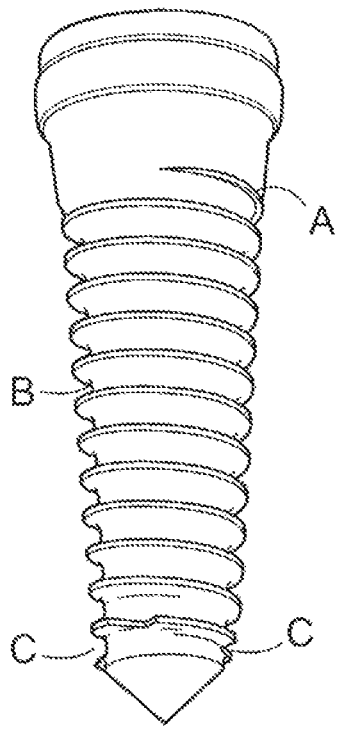
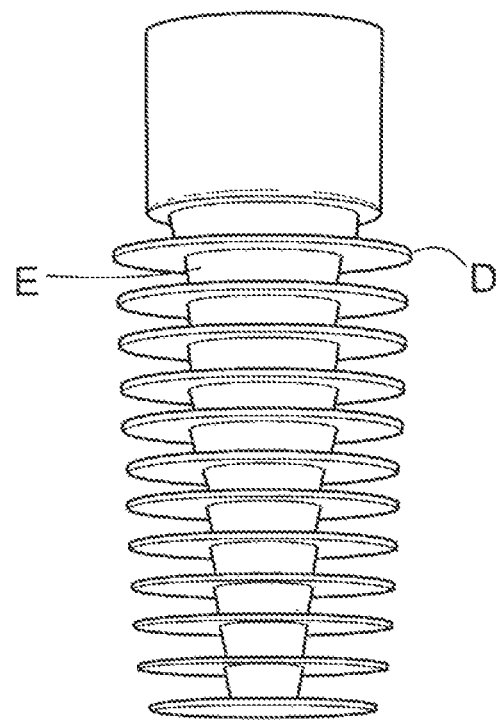
PRIOR ART
Fig. 1
PRIOR ART
Fig. 2

DENTAL IMPLANT HAVING SPLIT FINS

BACKGROUND OF THE INVENTION

1) Field of the Invention

The present invention relates to a dental implant having a plurality of split fins that are vertically spaced along the vertical axis of the fixture portion of the implant. These split fins hold the fixture portion of a dental implant stationary within the patient's jaw by engaging the patient's jawbone and promoting osseointegration—the growth bone around and on the surface of the implant. Each split fin has a first end that is vertically spaced from a second end along the fixture's vertical axis such that the split fin extends from the first end and around the fixture's circumference along an inclined plane until it terminates at the second end so that the split fin creates a single spiral that extends around the entire circumference of the fixture portion of the implant. These split fins, by engaging the bone, form compartments along the length of the implant body. These compartments are "healing chambers" that allow isolation from outside influences such as microbes, chemicals or other potential irritants that may interfere with bone formation.

2) Description of Related Art

For almost as long as dental implants have been used and known in the art, two general types of implants have been used. A screw type implant shown in FIG. 1 and a fin type implant shown in FIG. 2. There are advantages and disadvantages to both types of implants. The screw type implant uses threads A that wrap around the circumference of the implant body B along an inclined plane. The threads A engage the surrounding bone in much the same fashion as a screw would engage the wood into which it is screwed.

The advantage of using a screw type implant is that it provides immediate stability to the implant due to the manner in which the threads A engage the patient's jaw bone. Thus, a screw type implant may be used almost immediately after placement in the patient's jaw. There are at least two disadvantages associated with the screw type implant. The first is that the use of a screw type implant increases the risk of the patient suffering from peri-implantitis, an infection, which if not properly and timely treated can lead to the failure of the implant. Screw type implants, especially those used on the patient's lower jaw allow bacteria such as streptococci, which has a round or generally spherical shape, to travel down the threads of the implant until it reaches the bottom of the implant. Once the bacteria has reached the bottom of the implant, it can then cause infection deep in the patient's jaw bone. This type of infection is a major concern when using a screw type implant from both a health and implant failure perspective. The body responds to this irritation by encapsulating the implant in reactive connective tissue which prevents bone formation at the surface of the implant.

Another disadvantage of the screw type implant is that cortical-like Haversian bone rarely forms on screw type implants during osseointegration. This is due to the fact that when inserted into the patient's jaw, the thread of a screw type implant creates one long open channel leading from the surface of the jawbone to the bottom of the implant opening created in the patient's jawbone. As osseointegration occurs, lamellar bone, which is also known as interstitial type bone, develops along the channel created by the thread and around the implant. Because there is no interruption in the channel created by the thread, there can be no healing chamber or healing compartments created in the patient's jawbone. This healing chamber or healing compartment is necessary for cortical-like bone, which is also known as Haversian bone, to develop around the implant. The development of the cortical-like bone is desirable because this bone has more intimate contact with the implant surface and improved mechanical properties such as being harder and more dense that, over time, will continue to improve. Therefore, another disadvantage of the screw type implant is that the cortical-like bone is not likely to develop around the implant as is desired.

Another disadvantage associated with the screw type implant is that forces normally associated with chewing food can over time cause the implant to come unscrewed and to work its way back out of the patient's jaw. To prevent this from happening, an anti-rotational groove C is often cut into the bottom most thread of the implant. This anti-rotational groove C is generally wedge shaped and allows bone to grow within the groove, thus, preventing the implant from coming unscrewed or backing out of the patient's jaw.

While the fin type implant shown in FIG. 2 addresses some of the disadvantages of the screw type implant, it has its own disadvantages too. The fin type implant uses a number of circular disc-shaped fins D that wrap around and enclose the entire circumference of the implant body E. These fins D are vertically spaced from one another along the vertical axis of the implant body E and are generally parallel to one another. In some instances, each of the fins has the same diameter. In other instances, the fins can have decreasing diameter to give the fin type implant a generally conical shape. The fins lessen a patient's risk of the patient suffering from peri-implantitis by removing the inclined plane along which the threads wrap around the implant body. As osseointegration occurs, the fins create a number of sealed compartments so that bacteria that develops on one fin cannot travel down to the next fin. This allows the body to fight and defeat any infection without allowing the infection to spread further into the patient's jawbone.

As discussed above, the creation of separate healing chambers or healing compartments promotes the development of cortical like bone. Because the fin type implant creates such chambers, it is well suited for the development of cortical-like bone.

The fin type implant also removes the need for inclusion of an anti-rotational groove. Because the fin type implant is inserted rather than screwed into the patient's jaw, there is no risk that the implant will come unscrewed as osseointegration occurs.

The major disadvantage of the fin type implant is that the implant has very little initial stability in the patient's jaw. Unlike a screw type implant that immediately engages the bone through the use of threads, a fin type implant is inserted into a hole that has been created in the patient's jaw that has the same or slightly larger diameter than the fin type implant. Upon insertion, the fin type implant will remain relatively loose and/or susceptible to movement within the patient's jaw. Until osseointegration has occurred, forces normally associated with chewing will cause a newly installed fin type implant to wiggle or move about too much to provide immediate functionality of the implant. This inherent instability encourages the formation of a fibrous capsule around the implant and prevents bone formation at the implant surface. Instead, the fin type implant will not be adequately functional until osseointegration has occurred over a period of time, typically 4-5 months.

Accordingly, it is an object of the present invention to provide an implant that will provide a high level of initial stability so that the implant will be functional shortly after being placed in the patient's jaw bone, while at the same time creating the desirable healing compartments.

Accordingly, it is an object of the present invention to provide an implant that will reduce the risk of a patient developing infections such as peri-implantitis.

Accordingly, it is an object of the present invention to provide an implant that will reduce the risk that bacteria will travel down the implant body or spread to the patient's jaw bone.

Accordingly, it is an object of the present invention to provide an implant that will promote the formation of cortical-like bone during the osseointegration process.

Accordingly, it is an object of the present invention to provide an implant that can easily be incorporated into all existing root-form implant systems, regardless of the material used in the implant.

SUMMARY OF THE INVENTION

The above objectives are accomplished according to the present invention by providing a dental implant anchorable in a jawbone comprising an implant body having an upper (crestal) portion and a lower (apical) portion; an abutment receiving hole defined in the upper (crestal) portion of said implant body that is adapted to receive and secure an abutment so that a dental prosthesis may be carried by said upper (crestal) surface of said implant body; a first split fin carried by said implant body so that said first split fin extends outwardly from said implant body by a width that is uniform along the entire length of said first split fin, wherein said first split fin extends from a first end along an inclined plane and around the entire circumference of said implant body and terminates at a second end so that said first split fin completes at least one but less than two rotations around the circumference of said implant body; and wherein said first end and said second end are vertically spaced along said implant body.

In one embodiment, the first split fin rotates around the circumference of said implant body such that said first end and said second end are aligned along a single vertical axis so that said first end is located on said implant body at a point that is directly above said second end. In another embodiment, said first end is vertically spaced from said second end by a distance in the range of 0.25 millimeters to 1.25 millimeters.

In another embodiment, the dental implant further comprises a second split fin carried by said implant body at a point below (apical to) said first split fin so that said second split fin extends outwardly from said implant body by a width that is uniform along the entire length of said second split fin, wherein said second split fin extends from a first end along an inclined plane and around the entire circumference of said implant body and terminates at a second end so that said second split fin completes at least one but less than two rotations around the circumference of said implant body. In this embodiment, the second split fin is vertically spaced below (apical to) said first split fin by a distance in the range of 0.125 millimeters to 3.125 millimeters. In other embodiments, the second split fin is vertically spaced below (apical to) said first split fin by a distance in the range of a minimum distance equal to half of the vertical distance between said first end and said second end of said first split fin and a maximum distance equal to two and one half times the vertical distance between said first end and said second end of said first split fin. In either embodiment, the width of said second split fin may be equal to the width of said first split fin. In one embodiment, the second split fin rotates around the circumference of said implant body such that said first end and said second end of said second split fin are aligned along a single vertical axis so that said first end is located on said implant body at a point that is directly above (crestal to) said second end. In this embodiment, the first end of said second split fin is vertically spaced from said second end of said second split fin by a distance in the range of 0.25 millimeters to 1.25 millimeters.

In another embodiment, the dental implant comprises a third split fin carried by said implant body at a point below (apical to) said second split fin so that said third split fin extends outwardly from said implant body by a width that is uniform along the entire length of said third split fin, wherein said third split fin extends from a first end along an inclined plane and around the entire circumference of said implant body and terminates at a second end so that said third split fin completes at least one but less than two rotations around the circumference of said implant body. In this embodiment, the first split fin, said second split fin and said third split fin are all equidistant from one another and the width of said first split fin, said second split fin and said third split fin is equal.

In any of these embodiments, the dental implant may further comprise an extension member carried by said upper (crestal) portion of said implant body, said extension member having an upper (crestal) surface that defines an abutment receiving hole. In such an embodiment, the extension member has a generally frustroconical shape and said upper surface has outer edges that are beveled. In this embodiment, the implant body has a generally cylindrical shape and said lower (apical) portion of said implant body has a generally conical shape.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 shows a perspective view of a prior art screw type implant.

FIG. 2 shows a perspective view of a prior art fin-type implant.

Figure 3A:
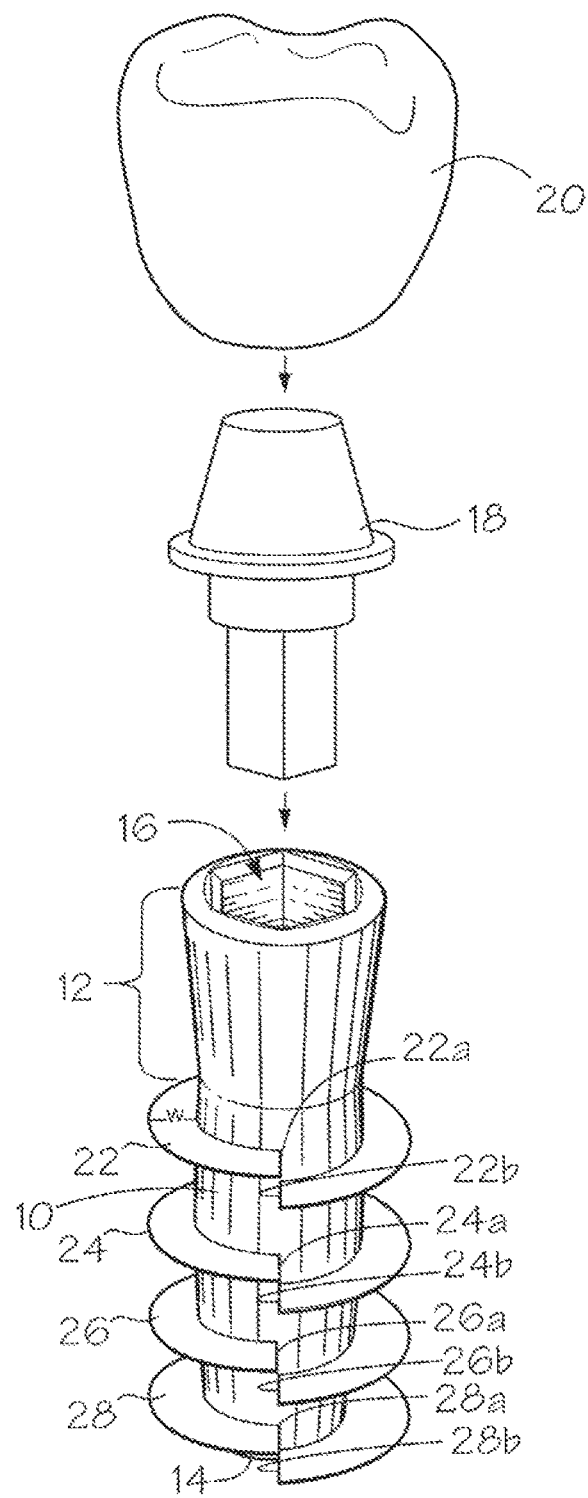
FIG. 3A shows a perspective view of an embodiment of the present invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The terms "upper," "crestal" "apical" and/or "lower" are used without reference to gravity. The term "upper" and/or "crestal" indicates the property of being close to the dental prosthesis whereas the term "lower" and/or "apical" indicates the opposite property. The terms "down," "downward," "up", "upward" or similar variations are similarly made without reference to gravity. The terms up, upward and similar variations refer to the direction towards the dental prosthesis. The terms down, downward and similar variations refer to the direction away from the dental prosthesis.

Figure 3B:
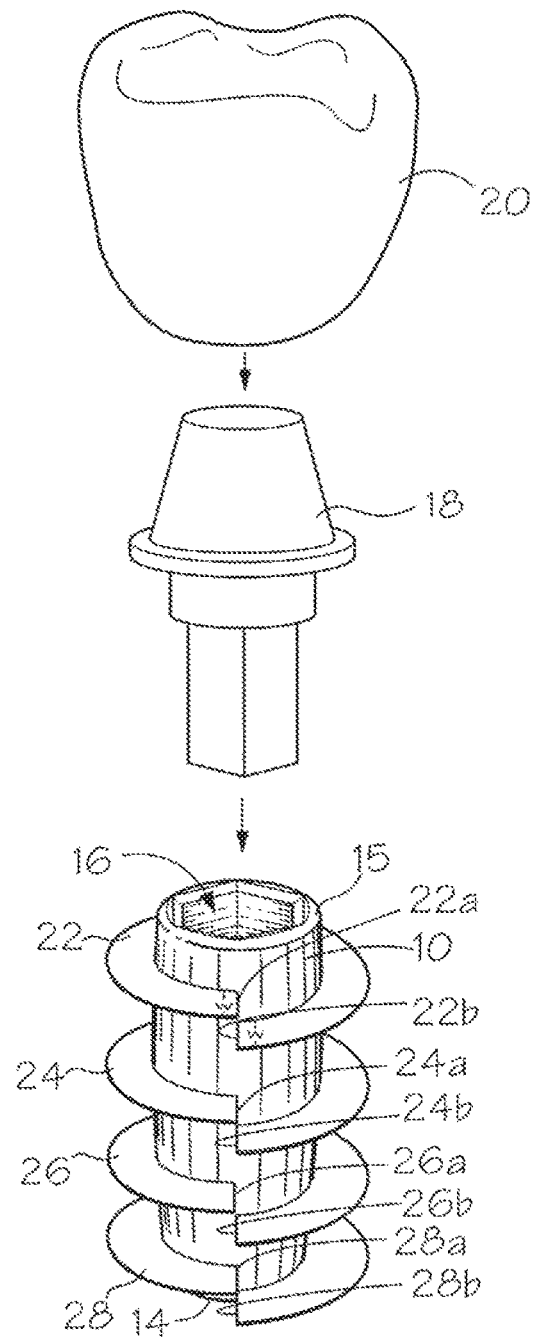
FIG. 3B shows a perspective view of another embodiment of the present invention.
Figures 4, 5:
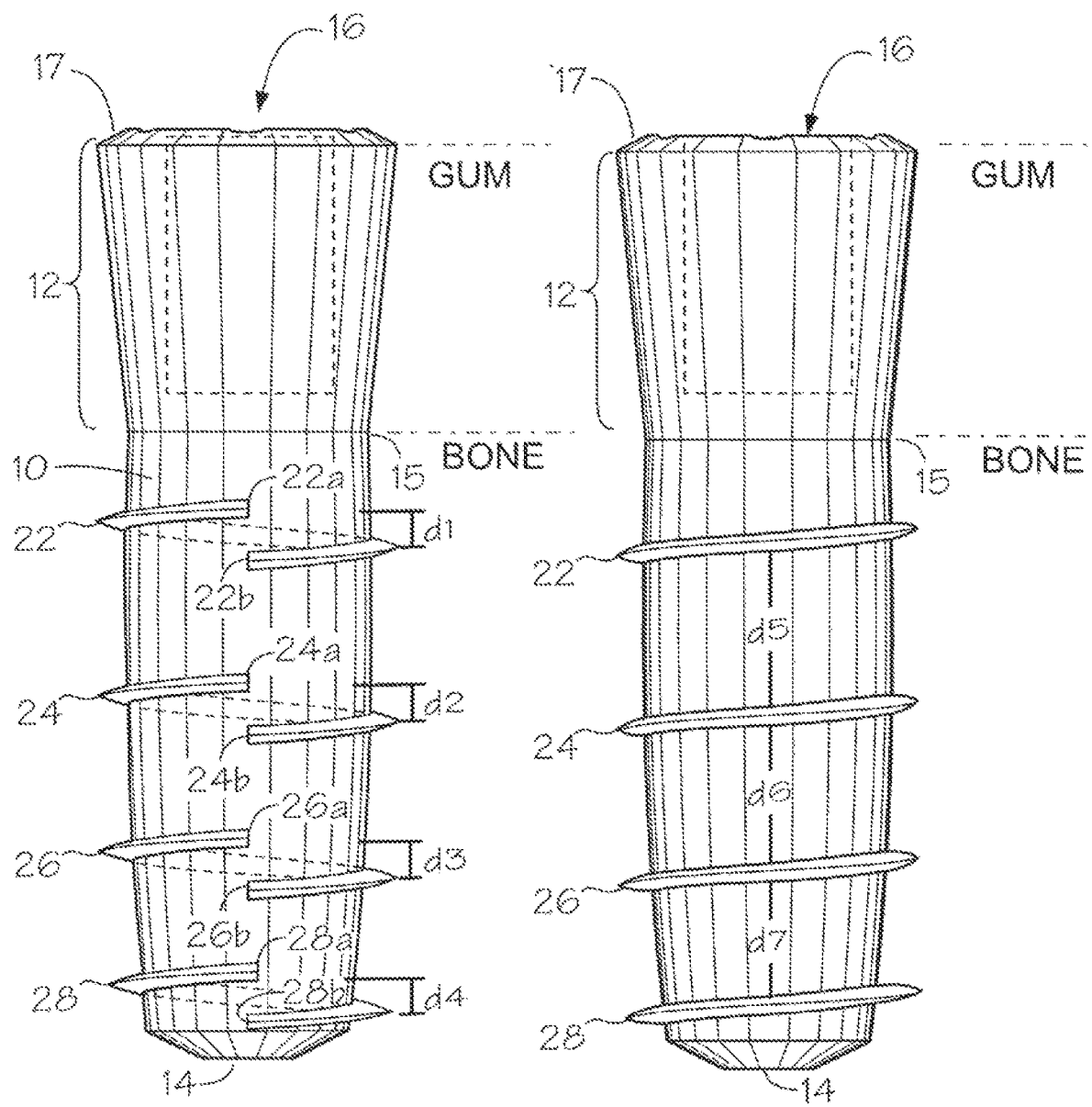
FIG. 4 shows a side elevation view of a first side of an embodiment of the present invention.
FIG. 5 shows a side elevation view of a second side of an embodiment of the present invention.

Referring now to FIGS. 3A, 4 and 5, a first embodiment of the invention will now be described. In this embodiment, the present invention includes an implant body 10, having an upper portion (shown as 15 in FIG. 3B) to which an extension member 12 is attached by integral or detachable means and a lower portion 14. In at least one embodiment, the extension member 12 comprises a permucosal extension. The extension member includes an abutment receiving hole 16 that is adapted to receive and secure an abutment 18 so that a dental prosthesis 20 can be secured to the implant body 10 by means of the abutment receiving hole 16. The abutment 18 may be secured to abutment receiving hole 16 by any means known in the art such as the use of corresponding threads disposed on the walls of abutment receiving hole 16 and on the abutment, by adhesive or by friction fit. In the shown embodiment, the abutment receiving hole 16 has a hexagonal shape. In alternate embodiments, the abutment receiving hole can have any number of shapes known in the art so as to match the shape of the stem of the abutment 18 and/or to accommodate the means for securing the abutment within the abutment receiving hole. In alternate embodiments, the abutment receiving hole 16 may be replaced with an abutment connection member (not shown) that protrudes upwardly from either the upper portion 15 of the implant body 10 or the extension member. The abutment connection member is adapted to be received by and secured into the dental prosthesis 20 by any means generally known in the art, such as the use of corresponding threads disposed on the walls of abutment connection member and on dental prosthesis, by adhesive or by friction fit. While FIG. 3B shows another embodiment of the invention, wherein the extension member 12 is missing and the abutment receiving hole 16 is formed in the upper portion 15 of the implant body 10, reference can be made to FIG. 3B for purposes of describing other elements such as the split fins 22,24, 26 and 28.

In the embodiment shown in FIGS. 3A-3B and 4-5, the implant body 10 has a generally cylindrical shape. In alternate embodiments, however, the implant body may have a generally conical shape. The extension member 12 has the same or different shape as the implant body 10, such that the extension member may have any number of shapes including a generally conical or generally cylindrical shape.

The implant body 10 includes a plurality of split fins 22, 24, 26 and 28 that are vertically spaced along the vertical axis of the implant body 10, said axis extending between the bottom portion 14 and the abutment receiving hole 16. In the shown embodiment, the present embodiment include four split fins 22, 24, 26, and 28. In alternate embodiments, the invention could include any number of split fins, depending on the length of the implant body and the spacing between the split fins. In at least one embodiment, each of the split fins 22, 24, 26 and 28 are spaced equidistantly from one another. In alternate embodiments, however, the distance between the split fins could vary so that the distances between the split fins could increase or decrease toward the bottom portion 14 of the implant.

While not always the case, in at least one embodiment, each of the split fins 22, 24, 26 and 28 has the same general arrangement as the other split fins. In such an embodiment, split fin 22, has a first upper end 22a that is vertically spaced along the implant's vertical axis from a second lower end 22b. In one embodiment, split fin 22 has a uniform width W that protrudes generally perpendicularly from the surface of the implant body 10 such that the width at the first end 22a and the second end 22b is the same as the width at various points along the length of the split fin 22. In alternate embodiments, however, split fin 22 could have a non-uniform width such that the first end 22a and second end 22b are tapered and have a width that is less than the width of the rest of the split fin 22. The split fin 22 extends along an inclined plane and around the entire circumference of the implant body 10 starting at the first end 22a and terminating at the second end 22b. The split fin 22 creates a single spiral that extends around the entire circumference of the body 10 of the implant. In the shown embodiment, the split fin 22 spirals along the inclined plane in a clockwise direction when looking down the vertical axis of the implant body 10 from the abutment receiving hole 16. In alternate embodiments, the split fin 22 could spiral around the implant body 10 in a counterclockwise direction. This same arrangement is true for the other split fins 24, 26 and 28 as well.

Because the split fins 22, 24, 26 and 28 spiral around the circumference of the implant body 10, their first ends 22a, 24a, 26a and 28a are vertically spaced from their second ends 22b, 24b, 26b and 28b along the implant body's vertical axis. In at least one embodiment this vertical distance d1, d2, d3 and d4 is in the range of 0.25 millimeters to 1.25 millimeters. While not always the case, in at least one embodiment, each of the split fins travels along the same inclined plane so that the vertical distances d1-d4 between the split fins' first ends 22a, 24a, 26a and 28a and second ends 22b, 24b, 26b and 28b are the same such that d1=d2=d3=d4.

For purposes of simplicity, discussion of why the arrangement of the split fins is important will be limited to discussion of only one of the split fins, namely the upper most split fin 22. The vertical spacing d1 between the split fin's first end 22a and the second end is important for at least three reasons. First, arranging the split fin 22 so that it spirals around the circumference of the implant body allows the split fin 22 to engage the patient's jaw bone in much the same manner as a traditional thread (shown as A in FIG. 1). Thus, the split fin 22 allows the implant body 10 to be screwed into the patient's jaw, thus, providing immediate stability to the implant when inserted into the patient's jaw. Second, the vertical distance d1 between the two ends 22a and 22b prevents bacteria from rolling down the split fin 22 and reaching the next lower split fin 24. Unlike traditional threading that provides a continuous path along which bacteria may travel, the upper split fin 22 is not connected to the next lower split fin 24. Within 24 hours of the implant's placement, a fibrin seal is established by the blood clotting process. As bone forms around and connects to the implant body during osseointegration, a wall of bone forms at the second end 22b, thereby, blocking the path between the second end 22b of the upper split fin 22 from the first end 24a of the next lower split fin 24 and preventing the bacteria from reaching the next split fin 24. Such a wall of bone would not be formed with the continuous threading used by the prior art. Third, the vertical distance d1 prevents the implant body from coming unscrewed by the forces normally associated with chewing, thus, eliminating the need for the anti-rotational groove used by the prior art. During the osseointegration process bone will also form around the first end 22a of the split fin 22, creating a wall or barrier that prevents the split fin 22 from following in reverse the same path initially grooved into the patient's jaw bone when the implant body 10 was inserted. This third advantage is maximized when the first end 22a and 22b of split fin 22 are not tapered. As the number of split fins are increased, more boney walls are created at the first ends of the split fins as to prevent the implant from coming unscrewed from the patient's jawbone. In the shown embodiment, four split fins 22, 24, 26 and 28 are included. In alternate embodiments, however, any number of split fins could be used. This anti-rotational property can be enhanced greatly by keeping the split fins out of time with each other, that is not in the same thread timing.

There are two ways to keep the split fins out of the same thread timing. The first way is to change the angle of descent used by the various split fins 22, 24, 26 and 28. The angle of descent of an individual split fin, i.e. 22, can be changed by varying the distance d1 between the first fin's first end 22a and second end 22b. The greater the distance d1 is between the two ends 22a and 22b, the greater the angle of descent will be such that the split fin will follow a steeper inclined plane as it wraps around the circumference of the implant body 10. In such an embodiment, the distances d1, d2, d3 and d4 could all be different such that each split fin has a different angle of descent. The use of varying angles of descent insures that each split fin cuts its own channel in the patient's jawbone such that split fin 26 does not simply follow the channel cut by split fin 28. Another way to keep the split fins out of the same thread timing is to position the split fins such that their first and second ends do not vertically align. Using the two upper most split fins as an example, split fin 24 could be rotated around the circumference of the implant body 10 such that the first and second end 24a and 24b of the lower split find 24 do not align with the first and second end 22a and 22b of the upper split fin 22. By varying the alignment of the split fins first and second ends, more boney walls can be created that are not aligned with one another.

Another advantage of varying the thread timing of the split fins is that the individual healing compartments created by each fin will be even more isolated from the other healing compartments, thereby, further preventing the spread of infection and/or microbes and further promoting the growth of cortical-like bone around the implant. Because the first and second ends 22a and 22b of split fin 22 are separated by distance d1, the channel created in the patient's jaw bone is interrupted, thus, creating a separate healing compartment than the ones created by the other split fins 24, 26 and 28. As such, cortical-like bone develops around the split fins 22, 24, 26 and 28 as well as around the implant body 10 of the present invention. As discussed above, this is an advantage that is not achieved by a traditional screw type implant. These healing compartments may be further separated the other healing compartments created by the present invention by positioning the split fins so the first and second ends of one split fin do not vertically align with the first and second end of another split fin as described above. Such a positioning allows a greater number and thicker walls to separate the healing compartments created by the present invention. Accordingly, the present invention is able to achieve all of the advantages of both the screw type implant (FIG. 1) and the fin type implant (FIG. 2) with little, if any, of the disadvantages associated with either type of implant.

While not always the case, in at least one embodiment, each of the split fins 22, 24, 26 and 28 are identical to one another. In one such embodiment, each split fin has a uniform width W which is in the range of 0.10 millimeters to 2.0 millimeters. In one such embodiment, the vertical distances d5, d6 and d7 separating the split fins are the same and in the range of (a) half (0.5) of the distance d1 between the split fin's first end 22a and second end 22b and (b) two and a half (2.5) of the distance d1 between the split fin's first end 22a and second end 22b such that d5=d6=d7 and $0.5(d1) \leq d5 \leq 2.5(d1)$. In such a case, the distance d5 between the first split fin 22 and second split fin 26 could be in the range of 0.125 millimeters to 3.125 millimeters. In cases where the distance d1 between the split fin's first end 22a and second end 22b is greater, the distance d5 between the split fins could be greater too. In alternate embodiments, the distances d5, d6 and d7 between the split fins may vary so that d5≥d6≥d7 or d5≤d6≤d7.

In the embodiments shown, the bottom portion 14 of the implant body has a generally frustro-conical shape and has generally rounded lower surface. In alternate embodiments, however, the lower portion 14 could have a generally conical shape so that the lower most surface forms a point that could help puncture the patient's jawbone if necessary. Given that the implant opening is typically already formed using surgical instruments, the lower portion 14 could generally have any shape known in the art.

Referring now to FIG. 3B, another embodiment that lacks the extension member (shown as 12 in FIG. 3A) is shown. This embodiment is arranged in generally the same manner as the embodiments shown in FIGS. 3A and 4-5 but could also be arranged in the number of variations discussed in relation to those figures. Because the embodiment in FIG. 3B does not have an extension member, the abutment receiving hole 16 is formed directly into the upper portion 15 of the implant body 10.

Figure 6:
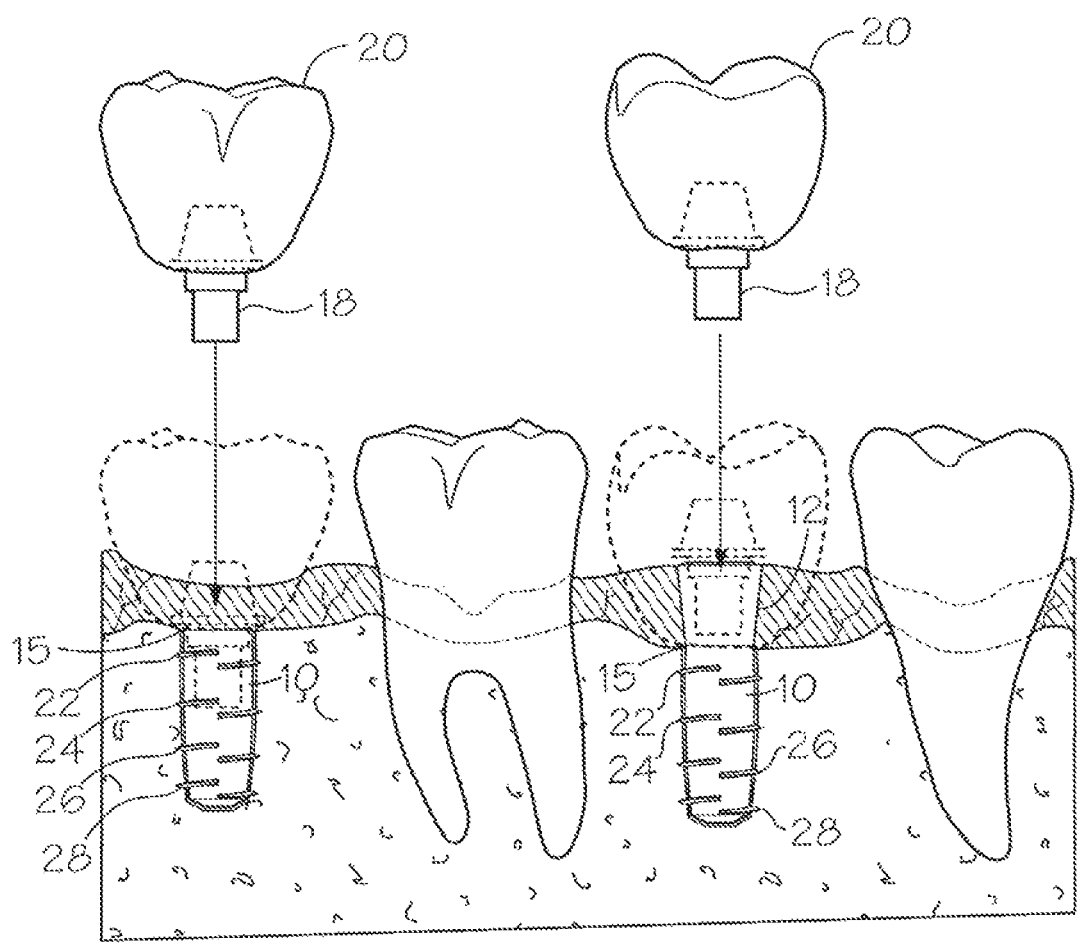
FIG. 6 shows a cross sectional view of a patient's jaw having at least two embodiments of the present invention implanted therein.

Implant bodies having an extension member are generally known as tissue level implants, whereas implant bodies lacking such an extension member are generally known as bone level implants. As can be seen in FIGS. 4-6, regardless of whether a tissue level or bone level implant is used, the implant body 10 is inserted into a patient's jawbone until the upper portion 15 of the implant body 10 is flush with or adjacent to the surface of the bone. In tissue level implants, the extension member 12 extends from the surface of the bone to a point that is flush with or adjacent to the surface of the patient's gum line. When a tissue level implant is used, the surgical procedure for installing the implant may be accomplished in one step. The gum is allowed to heal around the extension member prior to the connection of the dental prosthesis 20 to the extension member 12 by way of the abutment 18 and abutment receiving hole.

When a bone level implant is used, the surgical procedure for installing the implant is accomplished in two steps. First, the implant body is surgically inserted in to the patient's jawbone. Next the gum tissue is allowed to heal over the top of the upper portion 15 of the implant body 10. Once the gum tissue has adequately healed, a small incision is made in the patient's gum so that the dental prosthesis 20 can be connected to the implant body by way of the abutment 18 and the abutment receiving hole 16.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A dental implant anchorable in a jawbone comprising:
   An implant body having an upper portion and a lower portion;
   An abutment receiving hole defined in said upper portion of said implant body that is adapted to receive and secure an abutment so that a dental prosthesis may be carried by said upper surface of said implant body;
   A first split fin carried by said implant body so that said first split fin extends outwardly from said implant body by a width that is uniform along the entire length of said first split fin, wherein said first split fin extends from a first end along an inclined plane and around the entire circumference of said implant body and terminates at a second end so that said first split fin completes at least one full rotation but less than two rotations around the entire circumference of said implant body; and
   Wherein said first end and said second end are vertically spaced along said implant body.

2. The dental implant from claim 1 wherein said first split fin rotates around the circumference of said implant body such that said first end and said second end of said first split fin are aligned along a longitudinal axis of said dental implant body so that said first end is located on said implant body at a point that is directly above said second end along said longitudinal axis.

3. The dental implant from claim 1 wherein said first end is vertically spaced from said second end by a distance in the range of 0.25 millimeters to 1.25 millimeters.

4. The dental implant from claim 1 further comprising a second split fin carried by said implant body at a point below said first split fin so that said second split fin extends outwardly from said implant body by a width that is uniform along the entire length of said second split fin, wherein said second split fin extends from a first end along an inclined plane and around the entire circumference of said implant body and terminates at a second end so that said second split fin completes at least one but less than two rotations around the circumference of said implant body.

5. The dental implant of claim 4, wherein said second split fin is vertically spaced below said first split fin by a distance in the range of 0.125 millimeters to 3.125 millimeters.

6. The dental implant of claim 4, wherein said second split fin is vertically spaced below said first split fin by a distance in the range of a minimum distance equal to half of the vertical distance between said first end and said second end of said first split fin and a maximum distance equal to two and one half times the vertical distance between said first end and said second end of said first split fin.

7. The dental implant of claim 4, wherein the width of said second split fin is equal to the width of said first split fin.

8. The dental implant from claim 4 wherein said first end of said second split fin is vertically spaced from said second end of said second split fin by a distance in the range of 0.25 millimeters to 1.25 millimeters.

9. The dental implant from claim 4 wherein said second split fin rotates around the circumference of said implant body such that said first end and said second end of said second split fin are aligned along a single vertical axis so that said first end is located on said implant body at a point that is directly above said second end.

10. The dental implant from claim 4 wherein said first end and said second end of said first split fin are vertically aligned with said first end and said second end of said second split fin so that each of said first and second ends extend along a single vertical axis.

11. The dental implant of claim 4 further comprising a third split fin carried by said implant body at a point below said second split fin so that said third split fin extends outwardly from said implant body by a width that is uniform along the entire length of said third split fin, wherein said third split fin extends from a first end along an inclined plane and around the entire circumference of said implant body and terminates at a second end so that said third split fin completes at least one but less than two rotations around the circumference of said implant body.

12. The dental implant of claim 11, wherein the distance between said first split fin and said second split fin is equal to the distance between said second split fin and said third split fin.

13. The dental implant of claim 11, wherein the width of said first split fin, said second split fin and said third split fin is equal.

14. The dental implant of claim 1 further comprising an extension member carried by said upper portion of said implant body, said extension member having an upper surface that defines said abutment receiving hole.

15. A dental implant anchorable in a jawbone comprising:
  An implant body having an upper portion and a lower portion, wherein said upper portion is adapted to secure a dental prosthesis to said implant body; and
  A first split fin and a second split fin, each of which said first and second split fins being carried by said implant body so that each of said first and second split fins extends outwardly from said implant body and extends from a first end along an inclined plane and around the entire circumference of said implant body and terminates at a second end so that said first and said second split fins complete at least one but less than two rotations around the circumference of said implant body; and,
  Wherein said first end and said second end of said first split fin are vertically aligned with said first end and said second end of said second split fin so that each of said first and second ends extend along a single vertical axis.

16. The dental implant of claim 15 wherein each of said first and said second split fins has a uniform width from which each of said first and said second split fins extends outwardly from said implant body so that said width of said first end equals the width of said second end.

17. The dental implant of claim 16 wherein the width of said first split fin is equal to the width of said second split fin.

18. The dental implant of claim 15 further comprising a third split fin carried by said implant body so that said third split fin extends outwardly from said implant body, wherein said third split fin extends from a first end along an inclined plane and around the entire circumference of said implant body and terminates at a second end so that said third split fin completes at least one but less than two rotations around the circumference of said implant body.

19. The dental implant from claim 18 wherein said third split fin rotates around the circumference of said implant body such that said first end and said second end of said third split fin are aligned along a single vertical axis of said dental implant body.

20. The dental implant from claim 19 wherein said first end and said second end of said third split fin are vertically aligned with said first end and said second end of said first split fin and with said first end and said second end of said second split fin so that each of said first and second ends of said first, second and third split fins extend along a single vertical axis.

* * * * *